United States Patent [19]

Chao et al.

[11] Patent Number: 4,581,105

[45] Date of Patent: Apr. 8, 1986

[54] ELECTROCHEMICAL CELL OPERATING NEAR THE CRITICAL POINT OF WATER

[75] Inventors: Mou S. Chao, Midland, Mich.; Richard D. Varjian, Baton Rouge, La.; Gale G. Hoyer, Midland, Mich.; Michael E. Paulaitis, Newark, Del.

[73] Assignee: The Dow Chemical Company, Midland, Mich.

[21] Appl. No.: 622,803

[22] Filed: Jun. 20, 1984

[51] Int. Cl.$^4$ .................. C25B 1/00; C25B 1/12; C25B 3/00; C25B 15/02

[52] U.S. Cl. .................. 204/1 R; 204/59 R; 204/72; 204/98; 204/101; 204/105 R; 204/128; 204/129

[58] Field of Search .................. 204/1 R, 39, 59 R, 60, 204/72, 98, 101, 105 R, 128, 129

[56] References Cited

U.S. PATENT DOCUMENTS 4,457,812  7/1984  Rado .................................. 204/67

OTHER PUBLICATIONS

Bard et al., "Electrochemical Separation Methods", Separation Research Program, Center for Energy Studies, 1–84.

Silvestri et al., "Electrochemical Processes in Supercritical Phases", Angew. Chem. Int. Ed. Engl. 20 (1981), No. 1, pp. 101–102.

"Energy Studies", Newsletter for the Center for Energy Studies of the University of Texas at Austin, vol. 8, No. 4, Mar., Apr. 1983, p. 3.

Primary Examiner—John F. Niebling
Assistant Examiner—Terryence Chapman
Attorney, Agent, or Firm—James H. Dickerson, Jr.

[57] ABSTRACT

The invention is a method for operating an electrochemical cell of the type having an anode and a cathode which are in contact with an aqueous electrolyte in the presence of at least one electroactive species, said method comprising: electrochemically converting at least a portion of at least one electroactive species to at least one electrochemical product while maintaining said aqueous electrolyte at supercritical fluid conditions.

22 Claims, No Drawings

ELECTROCHEMICAL CELL OPERATING NEAR THE CRITICAL POINT OF WATER

BACKGROUND OF THE INVENTION

This invention relates to the operation of electrochemical cells and particularly to the operation of electrochemical cells containing an aqueous electrolyte in a supercritical fluid (SCF) state.

The liquid-vapor critical temperature (Tc) of a pure substance is the temperature at which, in a closed container, the vapor phase reaches the same (critical) density as the liquid phase. With rising temperature at vapor saturation, the two phases merge into a single supercritical fluid at this temperature, which is evidenced visually by the disappearance of the meniscus separating the two phases. Accordingly, there also is a unique critical temperature, critical pressure, and other critical properties for each compound. Solutions exhibit the same phenomena whereby the composition as well as the density of the two phases becomes identical at the critical temperature of the solution.

For example, to bring water to the supercritical state, the temperature and pressure must be raised above 374° C. and 22.06 mega Pascals (MPa), respectively. In the case of supercritical water (SCW), the density, dielectric constant, hydrogen bonding, and certain other physical properties are so altered that water behaves much as a moderately polar organic liquid would under ambient conditions. SCW, above 374° C., is miscible with gases such as nitrogen, oxygen and air in all proportions.

An excellent discussion of SCF's can be found in "Supercritical Fluids", Environmental Science and Technology, Volume 16, No. 10, pp. 548A–551A.

Electrochemical cells are used throughout industry for a variety of purposes including electrolytic production of compounds, electroplating, and as batteries or fuel cells.

To minimize the amount of energy consumed, it is desirable to operate an electrochemical cell in the most efficient manner possible. One way of doing so is to maximize the mass transfer rates of reactants and products to, and from, the surface of the electrodes. This can be accomplished, for example, through the use of turbulence promoters located inside the electrolysis compartments of cells. Turbulence promoters take the form of nets, inert beads, strips, or rods, perpendicular to the flow the electrolyte or they may be forms machined on the electrode itself. Turbulence promoters are designed to increase the mass transfer rates of materials to, and from, the electrode surfaces, but provide only marginal improvement.

It would be desirable to increase the efficiency of electrochemical cells without the need for turbulence promoters or other devices. The present invention provides such a method.

SUMMARY OF THE INVENTION

The invention is a method for operating an electrochemical cell of the type having an anode and a cathode which are in contact with an aqueous electrolyte in the presence of at least one electroactive species, said method comprising: electrochemically converting at least a portion of at least one electroactive species to at least one electrochemical product while maintaining said aqueous electrolyte at supercritical fluid conditions.

DETAILED DESCRIPTION OF THE INVENTION

For complete understanding of the present invention, it is helpful to define certain words which will be used throughout the description.

"Galvanic cell" means an electrochemical cell in which one or more electroactive species are reacted to produce electrical energy and one or more electrochemical products (energy producing cells). Such cells include, for example, batteries and fuel cells.

"Electrolytic cell" means an electrochemical cell in which electrical energy is used to convert one or more electroactive species into one or more electrochemical products (energy consuming cells). Such cells include, for example, electroplating cells and electrosynthesis cells.

"Electroactive species" means a reactant in an electrochemical reaction. Electroactive species may be inorganic or organic materials. Such materials may be dissolved or dispersed in the electrolyte or they may be present as one of the electrodes in the electrochemical cell.

"Electrolyte" means an aqueous liquid present in an electrochemical cell in contact with both electrodes. The electrolyte is electrically conductive and contains an ionizable material. The electrolyte provides a pathway for electrical current to pass between the electrodes.

"Electrochemical cell" means a cell having an anode, a cathode and an electrical connection therebetween. Such cells may be operated as galvanic cells or electrolytic cells.

"Supercritical fluid conditions" (SCF conditions) means the temperature and pressure at which the vapor phase and the liquid phase of a compound or solution merge into a single phase. The SCF condition for a particular material will vary depending upon the composition of the fluid.

"Supercritical fluid" (SCF) means an aqueous fluid at or above its SCF condition.

An electrochemical cell operated under SCF conditions operates very efficiently without the use of turbulence promoters. The benefits of operating a cell under SCF conditions are thought to result from several factors:

(1) SCF's have a viscosity lower than corresponding fluids not under SCF conditions. This provides high mass transfer rates of electroactive species to and/or away from the electrode surfaces. Thus, electrochemical reactions can occur more rapidly in fluids under SCF conditions, than in fluids not under SCF conditions;

(2) Certain materials which are insoluble or slightly soluble in water at ambient conditions (particularly organic materials) are substantially completely miscible with water under SCF conditions. Thus, electrochemical reactions which would not occur (or occur to only a slight degree), in cells operated at ambient conditions, occur very rapidly in cells operated at SCF conditions; and (3) The thermodynamics and kinetics of many reactions are more favorable under SCF conditions than under ambient conditions.

Thus, the present invention provides a method for operating an electrochemical cell very efficiently through the use of SCF's.

The present invention uses an aqueous electrolyte under SCF conditions. It is thought that the electrolyte must be aqueous to provide a sufficient electrical conductivity for the passage of electrical current between the electrodes. It is, however, entirely possible that certain nonaqueous electrolytes could be formulated which would be acceptable. It is necessary, however, that the electrolyte be sufficiently electrically conductive to be operable for the purposes of an electrochemical cell.

Since pure water is substantially completely electrically non-conductive, it is necessary that an ionizable material be dissolved into the water. The particular ionizable material is not critical to the operation of the present invention. It may be a material that does not take part in the electrochemical reactions, or it may be an electroactive species, which does take part in the electrochemical reactions. Examples of suitable ionizable materials include, for example, alkali metal halides and metal salts.

The critical temperature of liquids or solutions may be determined by means of a pressure cell with a window. The lowest temperature at which the meniscus of equal volumes of the liquid and the vapor disappears is the critical temperature. The SCF conditions of pure water are 374° C. and 22.06 MPa, however, as materials are dissolved into the water, the SCF conditions change. For example, the SCF conditions of various concentrations of NaCl in water are as follows:

| Critical Temperature (°C.) | Critical Pressure (MPa) | Critical Composition (Wt. % NaCl) |
|---|---|---|
| 374 | 22.06 | 0 |
| 380 | 23.43 | 0.6 |
| 390 | 25.98 | 1.7 |
| 400 | 28.53 | 2.6 |
| 425 | 35.59 | 5.0 |
| 450 | 42.16 | 7.1 |
| 475 | 50.49 | 9.3 |
| 500 | 59.02 | 11.5 |
| 525 | 66.96 | 13.6 |
| 550 | 75.98 | 15.6 |
| 575 | 84.51 | 17.6 |
| 600 | 92.16 | 19.6 |
| 625 | 100.2 | 21.5 |
| 650 | 108.1 | 23.2 |
| 675 | 116.3 | 24.8 |
| 700 | 123.6 | 26.4 |

Increasing the temperature of SCF's lowers their density. Since the solubility of certain materials, particularly inorganic salts, appears to be directly related to the density of the fluid, inorganic salts may not be as soluble at higher temperatures. Thus, when inorganic salts are present in the electrolyte, it is preferable to use higher pressures to maintain the density of the SCF and, thus, maintain the solubility of the inorganic salts.

Methods for determining the SCF condition and the SCF conditions of a variety of aqueous inorganic solutions and aqueous organic solutions may be found in the following articles:

"Liquid-Vapor Critical Temperatures of Several Aqueous-Organic and Organic-Organic Solution Systems", by W. L. Marshall and E. V. Jones, J. Inorg, Nucl. Chem., 1974, Vol. 36, pp 2319-2323, Pergamon Press; and "Liquid-Vapor Critical Temperatures of Aqueous Electrolyte Systems", W. L. Marshall and E. V. Jones, J. Inorg. Nucl. Chem., 1974, Vol. 36, pp. 2313-2318, Pergamon Press.

The present invention may be used in various types of electrochemical cells including electrolytic cells and galvanic cells.

Electrolytic cells include, for example, electroplating cells, in which an electrical current is passed through an aqueous electrolyte under SCF conditions and containing a metal ion (electroactive species). The passage of electrical current reduces the metal ions and causes them to electroplate onto one of the electrodes. The metal ions in the SCF may be provided from a metal salt dissolved in the electrolyte or from one of the electrodes. Maintaining the electrolyte under SCF conditions increases the electroplating rate of the metals onto the surface of the electrode. Thus, a SCF electroplating cell operates more efficiently than electroplating cells under ambient conditions.

Examples of electroplating cells include:
(1) Zinc electroplated from a zinc sulfate solution;
(2) Copper electroplated from an acid solution where copper ions are provided to the solution by a copper cathode;
(3) Manganese electroplated from a manganese sulfate/ammonium sulfate solution; and
(4) Cobalt electroplated from a cobalt salt solution.

Electrolytic cells also include electrosynthesis cells in which electrical current is passed through an electrolyte under SCF conditions and containing an electroactive species. The passage of the electrical current induces chemical changes in at least some of the electroactive species and converts them into at least one electrochemical product. The maintenance of the electrolyte under SCF conditions provides a high diffusivity of the electroactive species to the surface of the electrode and a correspondingly high diffusivity of the electrochemical products away from the electrode surface. The electroactive species may be provided from a material dissolved or dispersed into the electrolyte, or it may be provided from one of the electrodes.

Examples of electrosynthesis cells include:
(1) Chlor-alkali cells in which hydrogen, chlorine and sodium hydroxide are produced from an aqueous sodium chloride solution. Chlor-alkali cells usually have a diaphragm or ion exchange membrane positioned between the electrodes;
(2) Chlorate cells in which chlorates are produced from a brine solution. Such cells usually have no diaphragm or ion exchange membrane;
(3) Water electrolysis cells in which water is electrochemically converted into hydrogen and oxygen;
(4) Cells in which a hydrocarbon is electrochemically reacted to form other organic compounds; and
(5) Cells in which carbon (coal, shale, lignite, cellulose or other carbon materials) is converted into CO or $CO_2$ and where the carbon is supplied by one of the electrodes.

The present invention may also be used in various types of galvanic cells including, for example, fuel cells and batteries.

Batteries are devices that convert chemical energy into electrical energy. In batteries, high energy electroactive species are chemically converted to lower energy electrochemical products and electrical energy. Fuel cells are a special class of batteries in which high energy electroactive species are continuously fed into the battery and low energy electrochemical products are continuously removed. Optionally, high energy electroactive species may be provided to the fuel cell by one of the electrodes, for example, a coal electrode. Maintaining the battery or fuel cell electrolyte at SCF conditions provides high diffusivity of materials to, and away from, the electrode surface.

Examples of battery reactions include, for example:
(1) Hydrogen reacted with oxygen to produce water and energy;
(2) Liquid or solid hydrocarbons reacted with oxygen to produce oxidized hydrocarbons and energy;
(3) Carbon-zinc batteries;
(4) Ni-Cd alkaline batteries; and
(5) Lead-acid batteries.

The physical dimensions and shape of the electrochemical cells used to practice the present invention are not critical. For example, the cell may be cubic, rectangular, cylindrical, or other configurations. Electrochemical cells which operate under SCF conditions are preferably made from materials which will withstand the high temperatures and pressures to which they will be subjected.

Each cell may have one or more inlets to provide a pathway for the entrance of electrolyte or electroactive species. Such inlets may open: (1) into the anode portion of the cell, (2) into the cathode portion of the cell, (3) into a central area between the anode and the cathode, or (4) into a combination of the preceding positions. Likewise, each cell may have one or more outlets for removal of electrolyte or electrochemical products. Depending upon the reactions occurring, electrochemical products may be liquid, solid, gaseous or mixtures thereof. Thus, two outlets may be provided—one in the upper portion of the cell, to remove any gaseous electrochemical products and one in the lower portion of the cell to remove any liquid or solid electrochemical products. Outlets may open from the cathode area of the cell, the anode area of the cell, the central area between the anode and the cathode, or a combination of the preceding positions.

A plurality of electrochemical cells may be positioned adjacent to one another and connected to a common power source or to a common resistance load, depending upon whether the cell is operated as a galvanic cell or as an electrolytic cell.

Each cell, regardless of its operational mode, contains at least two electrodes—an anode and a cathode. The materials used for each electrode depends to a great degree upon the operational mode of the cell. However, each electrode is preferably electrically conductive and able to withstand the temperatures and pressures to which it will be exposed. Also, the electrode materials are preferably chemically stable in the presence of the electroactive species and the electrochemical products. The electrode body itself may be solid or foraminous and may optionally have a catalyst present on its surface to enhance the rate of reactions occurring at the electrode surface.

Suitable electrocatalysts depend upon the operational mode, the electroactive species and the electrochemical products desired. Electrocatalysts, when employed, may be present on the surfaces of the anode, the cathode, or both electrodes. Such catalysts are well known in the art and need no lengthy discussion for the purposes of this invention.

A separator is an optional element which may be positioned in an electrochemical cell between the anode and the cathode. It reduces the rate of flow of electroactive species and electrochemical products between the electrodes, thus minimizing the reconversion of electrochemical products. Although separators are not commonly used in electroplating cells or fuel cells, they are commonly present in batteries, and electrosynthesis cells. The separator is preferably permeable to the electroactive species and preferably substantially completely chemically and physically stable in the cell environment. Suitable separators include, for example, sintered glass, porous metals, inorganic ion exchange materials, unglazed porcelain, and woven and non-woven fabrics made from such things as fiberglass, and asbestos.

The cell walls and optional electrode backboards (to support the electrodes) are preferably physically and chemically stable in the cell environment. The cell walls, for safety reasons, should withstand the critical pressure without rupturing and may be internally or externally supported to increase their strength. Suitable materials of construction for the cell walls and backboards depend upon the chemical environment to which they will be exposed. The properties of various materials are readily available in many reference books and the selection of a suitable material is largely a matter of economics. Representative suitable materials include, for example, steel, iron, nickel, titanium and alloys thereof. The cell walls may also be clad, i.e., a metal or metal alloy on the inside with steel on the outside.

Cell Operation

Critical temperatures may be maintained in the cell by, for example: (1) placing a heating element or a heat exchanger inside the cell itself to heat the contents thereof, or (2) positioning the cell inside a temperature bath and transferring heat from the bath, through the cell walls, and into the contents of the cell.

Critical pressures may be maintained in the cell by, for example: (1) using high pressure pumps or compressors to pressurize the gaseous or liquid contents of the cell; (2) decreasing the cell volume without removing mass from the cell; or (3) heating the contents of the cell without increasing its volume or removing mass from the cell.

Electrochemical cells of the present invention may be operated: (1) incrementally, or (2) continuously.

In an incrementally operated cell, the electrolyte may be introduced into the cell under ambient temperature and pressure and thereafter heated and pressurized to SCF conditions, or the electrolyte may be introduced under SCF conditions. Conversely, in a continuously operated cell, it is necessary to introduce the electrolyte at critical pressure. Otherwise, the contents of the cell would be forced out through the electrolyte inlet, or, if a check valve were present in the inlet line, the electrolyte would not enter the cell because of the high pressure of the cell's contents.

After being introduced into the cell and being brought to SCF conditions, the electroactive species are then electrochemically reacted. When the cell is operated incrementally, the electrochemical product(s) may be allowed to remain in the cell until the cell is removed from operation for replenishment of the electroactive species. On the other hand, when the cell is operated continuously, the electrochemical products are preferably removed as additional electrochemical products are formed.

Details of the operational procedures for the various operational modes are shown in the following examples.

EXAMPLE I

This example shows the invention used in a galvanic cell and specifically in a fuel cell.

The fuel cell consists of a nickel housing containing a solid nickel anode in an anolyte compartment and a solid nickel cathode in a catholyte compartment. The compartments are separated by a separator constructed of asbestos. A 1.0 molar aqueous solution of sodium hydroxide is used as an electrolyte. Propane (an electroactive species) is fed into the anolyte compartment and oxygen (also an electroactive species) is fed into the catholyte compartment. Propane and oxygen are highly soluble in the sodium hydroxide electrolyte. The temperature and pressure of the electrolyte are raised to SCF conditions using a heating element and a high pressure pump. Spontaneous electrochemical reactions occur at the anode and the cathode which generate a voltage difference therebetween and send electrons flowing through an external circuit which connects the anode with the cathode. The electrochemical products produced dissolve in the electrolyte. The electrolyte is intermittently removed and the electrochemical products are thereafter removed from the electrolyte.

EXAMPLE II

This example shows the invention used in an electrolytic cell and specifically in an electrosynthesis cell.

The electrosynthesis cell consists of a titanium housing enclosing an anode in an anolyte compartment and a cathode in a catholyte compartment separated by a fibrous asbestos mat separator. The anode is an expanded metal titanium sheet coated with ruthenium oxide. The cathode is a perforated nickel sheet. A 1.0 molar solution of an aqueous sodium chloride brine, as an electrolyte, is fed into the anolyte compartment. The cell is maintained, at or near, the SCF conditions (430° C. and 35.98 MPa) using a heating element and a high pressure pump. Direct current in the potential range sufficient to cause the desired reactions ot occur is passed between the electrodes in the cell. The sodium chloride (electroactive species) reacts to form chlorine at the anode and hydrogen and hydroxyl ion at the cathode (all electrochemical products). The electroactive species and the electrochemical products are soluble in the electrolyte and dissolve therein. The anolyte is continuously removed from the cell and introduced into a cool, low pressure chamber where chlorine gas separates from the electrolyte. In a similar manner, hydrogen is separated from the catholyte effluent.

EXAMPLE III

This example shows the invention used in an electrolytic cell and specifically in an electrosynthesis cell.

Coal is the anode, and is an electroactive species. A perforated nickel sheet is the cathode, and a liquid permeable sheet is positioned between the electrodes to act as a separator. The electrolyte is a 1.0 molar aqueous solution of potassium hydroxide and is maintained at SCF conditions (400° C. and 29.41 MPa) using a heating element in the cell and a high pressure pump. Direct current is passed between the electrodes at a potential sufficient to cause the desired reactions to occur. At the anode, carbon in the coal is oxidized to CO and/or $CO_2$. These carbon oxides and most impurities in the coal are soluble and dissolve in the electrolyte at SCF conditions. At the cathode, water is reacted to form hydrogen and hydroxyl ions. Hydrogen and the carbon oxides are separated from the electrolyte outside the cell by lowering the pressure surrounding the electrolyte.

EXAMPLE IV

This example shows the invention used in a galvanic cell and specifically in a fuel cell.

In the fuel cell, coal is the anode and a perforated nickel sheet is the cathode. The anolyte and catholyte compartments are divided by a liquid permeable separator made of asbestos fibers. The electrolyte, a 1 molar aqueous potassium hydroxide solution, is brought to SCF conditions (400° C. and 29.41 MPa) using a heating element in the cell and a high pressure pump. Oxygen (an electroactive species) is fed to the catholyte chamber. Carbon (an electroactive species), in the coal, oxidizes spontaneously at the anode to form $CO_2$ and CO which will react with the potassium hydroxide to form carbonates, while oxygen spontaneously reduces at the cathode to form hydroxyl ions. Oxygen and the reaction products from the coal are soluble in the SCF electrolyte. The electrolyte is removed periodically and the electrochemical products are separated from the electrolyte. The cell is then recharged with fresh electrolyte.

EXAMPLE V

This example illustrates the invention used in a galvanic cell and specifically in a battery. It shows that $O_2$ and $H_2$ can be stored in respective compartments and may be subsequently used as a battery to provide power during discharging.

A 10 ml stainless steel cell was fitted with a pair of 1 $cm^2$ platinum electrodes. The electrodes were electrically insulated from the cell body by means of boron nitride seals. The cell was divided into two compartments with a coarse-sized glass frit (separator) positioned between the anode and the cathode. The cell was filled with 5 ml 0.2 molar aqueous $NaClO_4$ and brought to SCF conditions of about 400° C. using a heating element in the cell, and about 24.12 MPa using a high pressure pump. A D.C. current of 300 milliamps (ma) was applied to charge the cell for 25 minutes, during which $O_2$ and $H_2$ were generated at the two electrodes and stored in the electrolytes of the two compartments. Later they were used to produce water and electrical energy (discharge). On discharge at 10 ma, the voltage decayed from 0.5 volt to 0 volt within ¾ minute. After recharging at 10 ma for 1 minute, a 10 ma discharge provided voltage at 0.1 volt and decayed to 0 volt within ¼ minute. The 10 ma charging and discharging at 1 and ¼ minute were repeated more than 30 times with essentially the same behavior.

What is claimed is:

1. A method for operating an electrochemical cell of the type having an anode and a cathode which are in contact with an aqueous electrolyte containing at least one electroactive species, said method comprising:
    electrochemically converting at least a portion of at least one electroactive species to at least one electrochemical product while maintaining said aqueous electrolyte at supercritical fluid conditions.
2. The method of claim 1 including flowing electrical current through the electrolyte between the anode and the cathode at a potential sufficient to convert at least one electroactive species to at least one electrochemical product.

3. The method of claim 2 wherein the electroactive species is water and the electrochemical products are hydrogen and oxygen.

4. The method of claim 2 wherein there are at least two electroactive species.

5. The method of claim 4 wherein at least two electroactive species are inorganic materials.

6. The method of claim 5 wherein one electroactive species is oxygen and another electroactive species is sodium chloride.

7. The method of claim 4 wherein at least one electroactive species is an organic material and at least one electroactive species is an inorganic material.

8. The method of claim 7 wherein the organic material is coal and the inorganic material is oxygen.

9. The method of claim 11 wherein the inorganic material is oxygen.

10. The method of claim 1 wherein the electroactive species is dissolved in the electrolyte.

11. The method of claim 1 wherein the electroactive species is dispersed into the electrolyte.

12. The method of claim 1 wherein the electroactive species is provided by one of the electrodes.

13. The method of claim 12 wherein the electroactive species is carbon.

14. The method of claim 1 wherein the electroactive species is an inorganic material.

15. The method of claim 14 wherein the inorganic material is sodium chloride.

16. The method of claim 1 wherein the electroactive species is an organic material.

17. The method of claim 1 wherein an electrocatalyst is present on the surface of at least one of the electrodes.

18. The method of claim 1 wherein a liquid permeable separator is positioned between the anode and the cathode.

19. The method of claim 1 wherein the electrolyte is heated by a heating element in contact with the electrolyte.

20. The method of claim 1 wherein the electrolyte is pressurized by a high pressure pump acting on the contents of the cell.

21. The method of claim 1 including the steps of:
  (a) continuously introducing electroactive species into the cell; and
  (b) continuously removing electrochemical products from the cell.

22. The method of claim 1 including the steps of:
  (a) intermittently introducing electroactive species into the cell; and
  (b) intermittently removing electrochemical products from the cell.

* * * * *

UNITED STATES PATENT AND TRADEMARK OFFICE
CERTIFICATE OF CORRECTION

PATENT NO. : 4,581,105

DATED : April 8, 1986

INVENTOR(S) : Mou S. Chao, Richard D. Varjian, Gale G. Hoyer and Michael E. Paulaitis It is certified that error appears in the above-identified patent and that said Letters Patent is hereby corrected as shown below:

Column 7, line 42, "ot" should read --to--.

Column 9, Claim 9, "11" should read --7--.

Signed and Sealed this

Second Day of September 1986

[SEAL]

Attest:

DONALD J. QUIGG

Attesting Officer

Commissioner of Patents and Trademarks